US009098997B2

(12) United States Patent
Stewart et al.

(10) Patent No.: US 9,098,997 B2
(45) Date of Patent: Aug. 4, 2015

(54) FLIGHT TRAJECTORY PREDICTION WITH APPLICATION OF ENVIRONMENTAL CONDITIONS

(75) Inventors: Tamara S. Stewart, Lakewood, WA (US); Louis J. Bailey, Covington, WA (US); Charles J. Tytler, West Lafayette, IN (US)

(73) Assignee: The Boeing Company, Chicago, IL (US)

( * ) Notice: Subject to any disclaimer, the term of this patent is extended or adjusted under 35 U.S.C. 154(b) by 295 days.

(21) Appl. No.: 13/250,352

(22) Filed: Sep. 30, 2011

(65) Prior Publication Data

US 2013/0085672 A1 Apr. 4, 2013

(51) Int. Cl.
*G08G 5/00* (2006.01)
*G01C 21/00* (2006.01)

(52) U.S. Cl.
CPC ................ *G08G 5/003* (2013.01); *G01C 21/00* (2013.01); *G08G 5/0034* (2013.01); *G08G 5/0039* (2013.01)

(58) Field of Classification Search
CPC .. G08G 5/0034; G08G 5/0091; G08G 5/0021
USPC ........................... 701/528, 10, 120; 4/528, 10
See application file for complete search history.

(56) References Cited

U.S. PATENT DOCUMENTS

| | | | | |
|---|---|---|---|---|
| 6,600,991 | B1 | 7/2003 | Jardin | |
| 7,248,949 | B2 * | 7/2007 | Love et al. | 701/4 |
| 7,349,773 | B2 | 3/2008 | Berard | |
| 7,433,779 | B2 | 10/2008 | Deker et al. | |
| 7,797,102 | B2 | 9/2010 | Fortier | |
| 7,966,122 | B2 * | 6/2011 | Flynn et al. | 701/528 |
| 8,060,295 | B2 * | 11/2011 | Estkowski et al. | 701/120 |
| 8,160,759 | B2 * | 4/2012 | Baker et al. | 701/16 |
| 8,255,147 | B2 * | 8/2012 | Roberts et al. | 701/120 |
| 8,478,642 | B2 * | 7/2013 | Dey et al. | 705/14.4 |
| 2002/0039072 | A1 | 4/2002 | Gremmert et al. | |
| 2004/0078136 | A1 | 4/2004 | Cornell et al. | |

(Continued)

FOREIGN PATENT DOCUMENTS

EP 2290636 A1 2/2011

OTHER PUBLICATIONS

Lymperopoulos et al., "Model Based Aircraft Trajectory Prediction During Takeoff", AIAA Guidance, Navigation, and Control Conference and Exhibit, Aug. 21-24, 2006, pp. 1-12, Keystone, Colorado, AIAA 2006-6098.

(Continued)

*Primary Examiner* — John R Olszewski
*Assistant Examiner* — Todd Melton
(74) *Attorney, Agent, or Firm* — Ostrager Chong Flaherty & Broitman P.C.

(57) ABSTRACT

Systems and methods for generating a predicted flight trajectory using a combination of aircraft state data, flight information, environmental information, historical data or derived flight information from aircraft messaging which can be used for the transmission of environmental data. The generated trajectory prediction is assigned a level of confidence based on fidelity, merit or accuracy. The level of predicted accuracy is based on the number of and sources of the specific information, time, distance or flight phase. The predicted trajectory includes pseudo-waypoints at flight transitions not readily available in the flight information and also includes the environmental conditions at all waypoint (including pseudo-waypoint) locations.

26 Claims, 7 Drawing Sheets

(56) References Cited

U.S. PATENT DOCUMENTS

| | | | | |
|---|---|---|---|---|
| 2005/0071076 | A1 | 3/2005 | Baiada et al. | |
| 2006/0089760 | A1 | 4/2006 | Love et al. | |
| 2007/0078572 | A1 | 4/2007 | Deker et al. | |
| 2008/0288164 | A1 | 11/2008 | Lewis et al. | |
| 2009/0012660 | A1 | 1/2009 | Roberts et al. | |
| 2009/0012663 | A1* | 1/2009 | Mead et al. | 701/14 |
| 2009/0125221 | A1 | 5/2009 | Estkowski et al. | |
| 2009/0157288 | A1 | 6/2009 | Bailey et al. | |
| 2010/0049382 | A1 | 2/2010 | Akalinli et al. | |
| 2010/0152931 | A1* | 6/2010 | Lacombe et al. | 701/8 |
| 2010/0167723 | A1 | 7/2010 | Soumier et al. | |
| 2010/0241345 | A1 | 9/2010 | Cornell et al. | |
| 2011/0050458 | A1 | 3/2011 | Bailey et al. | |
| 2011/0054718 | A1 | 3/2011 | Bailey | |
| 2011/0210865 | A1* | 9/2011 | Lee et al. | 340/903 |
| 2012/0245834 | A1* | 9/2012 | Klooster et al. | 701/120 |
| 2013/0046422 | A1* | 2/2013 | Cabos | 701/3 |

OTHER PUBLICATIONS

Lygeros, "Towards a Next Generation ATM System: Model Based Conflict Detection and Resolution", Jan. 1, 2011, XP055092068.

Swierstra et al., "Common Trajectory Prediction Capability for Decision Support Tools", 5th USA/Eurocontrol ATM R&D Seminar, Budapest, Hungary, Jan. 1, 2003, XP055092111.

Extended European Search Report and Written Opinion, European Application No. 12185489.7 (European counterpart to the instant U.S. application), dated Dec. 20, 2013.

* cited by examiner

FLIGHT TRAJECTORY PREDICTION WITH APPLICATION OF ENVIRONMENTAL CONDITIONS

BACKGROUND

The present disclosure relates generally to aircraft traffic management, and more specifically, to systems and methods for computing a predicted flight trajectory for an aircraft.

In this section, characteristics of so-called "known" trajectory predictors are described. The adjective "known" is used to indicate prior art features known to one or more authors of this disclosure and should not be construed to be a representation concerning any prior art teachings not known to the authors.

Known trajectory predictors operate with the limitations of requiring an aircraft performance database to calculate a trajectory. The aircraft performance database itself can present limitations where content is limited or access to the information is limited. Additionally, the accuracy of known trajectory predictors can be inadequate. Some known trajectory predictors do not apply in situ and forecasted environmental conditions to trajectory prediction. Those trajectory predictors which apply environmental conditions typically use forecasted, not current environmental data. Some on-board flight plan systems have the capability to add environmental conditions to their predicted trajectories, but lack a database of current and forecasted environmental conditions. They may be provided a set of forecasted environmental conditions, but often that set is or will be outdated during the flight. Other trajectory predictors do not include knowledge systems to compile and manage data histories or monitor situational awareness of its own functions as evolving patterns for internal or external function use.

Thus the accuracy of known trajectory predictors is inadequate at least for the following reasons: (a) the users do not use current aircraft messaging, histories and state data; (b) users only use forecasted environmental data (current environmental observations are not incorporated); and (c) users do not know or anticipate all the pseudo-waypoints associated with a flight. Another distinguishing characteristic is that known trajectory predictors do not have the ability to adapt the output trajectory (e.g., by varying its fidelity) based on the input data.

Current trajectories predicted by ground systems are incomplete not only because the flight plan information they are built upon is incomplete, but also because they do not include pseudo-waypoints and associated metadata information, which omission affects the accuracy of the trajectory prediction. Pseudo-waypoints help complete the flight plan. A sequence of waypoints in a flight plan define the lateral projection of the flight route, but do not reflect more gradual transitions between the straight segments connecting waypoints. These gradual transitions entail changes of flight constraints at specific locations termed pseudo-waypoints which are neither listed in the flight plan nor stored in a navigation database.

Additionally, none of the trajectory metadata information (such as up-to-date weather information) is used dynamically by ground stations for optimizing flight operations. The fidelity of environmental data applied to current airborne on-board computer predictions and ground station applications is restricted by current methods. Without an accurate current flight trajectory prediction, environmental conditions processors do not know at what predicted locations or at what times to provide which environmental conditions data. Accuracy is lost for this reason and gained when appropriate environmental data is applied to the trajectory prediction.

To overcome these shortcomings, current solutions place the burden on the source to transmit its representation of the entire trajectory. These solutions do not address the accuracy issues of replicating the source trajectory nor is it desirable to do so due to the associated communication cost and the additional burden the increased messaging places on an already congested frequency.

An adaptive solution is needed that may resemble the originating source format or is based on user configuration declarations, flight parameters, or aircraft state information histories compiled and managed by an embedded knowledge system. Preferably, this solution should operate without an aircraft performance database and should address the accuracy of the trajectory prediction with other methods. Also, the solution must be able to produce multiple outputs (e.g., of varying fidelity) from the same source. Specifically, flight information is received and multiple trajectories are requested as the final output. The reason for this is that each customer has their own trajectory specification requirements. The solution must also ascertain the level of confidence or accuracy that the trajectory predictions must comply with to meet user requirements.

SUMMARY

The system disclosed herein generates a predicted flight trajectory using a combination of aircraft state data, flight information, environmental information, historical data or derived flight information from aircraft messaging which can be used for the transmission of environmental data. Furthermore, the generated trajectory prediction is assigned a level of confidence based on fidelity, merit or accuracy. The level of predicted accuracy is based on the number of and sources of the specific information, time, distance or flight phase.

Flight information necessary to compute the predicted trajectory is extracted and used, along with aircraft state data, messaging, and their histories, to calculate and derive the predicted trajectory. The improved predicted trajectory provides the greater accuracy needed for aviation applications and the selection of current/forecast environmental conditions, whether transmitted to an airborne platform or used for other ground-based applications. The predicted trajectory includes pseudo-waypoints at flight transitions not readily available in the flight information and also includes the environmental conditions at all waypoint (including pseudo-waypoint) locations. The predicted trajectory is generated in a form which may resemble the originating source or be based on a user configuration, flight parameters, or aircraft state information histories compiled and managed by an embedded knowledge system. The knowledge system is an optional component, dependent on the degree of accuracy required. In the scenario where a predicted trajectory history is utilized (to compute a new predicted flight trajectory), the knowledge system also assesses the trajectory generation for use in situational awareness for internal and external function applications, either in real-time or as post-flight processing.

The trajectory prediction generated from the methods and system disclosed hereinafter is completed without the use of any specific aircraft performance database, using the current flight information received and an independent environmental database. This trajectory prediction system also can adapt its output in dependence on a user configuration that is either static or dynamically based on available information or past known flight information. This trajectory prediction system also produces a higher accuracy solution due in part to utilizing in situ weather data (airborne sensor data correlated to locations in a three- or four-dimensional frame of reference) and forecasted environment data and in part due to utilizing techniques for deriving unknown flight data elements. The output solution can also include an identifier distinguishing the level of accuracy of and/or confidence in the trajectory predictions. This identifier is determined based on the original source of the information, current aircraft state, environmental conditions, and the algorithm employed to determine the solution. The identifier could then be used to enable specific optimization maneuvers by an aircraft or to identify additional flight messaging required.

The solution proposed herein is a system that can generate a trajectory prediction(s) dynamically or based on rules from a user configuration that addresses the multiple levels of accuracy/confidence required or needed. As an example, the generated trajectory prediction result may be dimensionally limited (i.e., two- or three-versus four-dimensional) based on the user configuration or based on the data fed into the generator. This resultant is assigned a specific level of confidence due to decision rules which are specific to the inputs and current flight environment.

The solution proposed herein also addresses the issue of accuracy. Aircraft messaging can be utilized during the generation of a trajectory prediction to increase the degree of accuracy, and thereby increase the level of confidence that the trajectory prediction may hold true. Real-time weather information (in situ weather) embedded in the aircraft messaging may also be utilized for higher-accuracy trajectory predictions. The accuracy of the trajectory prediction may be increased through a number of methods. These methods must consider the cost of each method. In the case of using aircraft messaging, analysis of available aircraft messaging must be conducted to the greatest extent possible before additional messaging is requested. This minimizes the business cost of aircraft communication.

The system disclosed herein predicts, with higher fidelity and greater accuracy, a trajectory that resembles the source flight plan system's trajectory. In order to match the source system, components of the source's flight plan/route which are never communicated, such as the pseudo-waypoints, must be derived from aircraft messaging and state data. For greater accuracy, the solution application's trajectory must apply current and forecast environmental conditions in the process of improving the predicted trajectory. These calculations are performed within the constraints of known flight information. In some cases not all flight information is available when trajectory calculations are needed. In these cases, it is preferred that the flight information be derived, calculated, and extracted from available messages, or extracted from an embedded knowledge system, which utilizes past flight information and trajectory objects. Because of business considerations, another option available is to request flight information needed for trajectory object data through additional messaging (via an Airline Operations Center (AOC), Air Navigation Service Provider (ANSP), data link service provider, etc.).

The trajectory prediction solution disclosed herein augments the flight plan/route to portray a more realistic flight path by incorporating pseudo-waypoints; waypoints not listed in the planned route, but located where aircraft maneuvers will occur and which define the flight profile, such as top of climb, top of descent, turn points, and change of aircraft speed, elevation or heading. In addition, the solution of the location of and time of arrival at the pseudo-waypoints is influenced by in situ and forecasted environmental conditions along the trajectory. Therefore, the trajectory predictor solution disclosed herein includes the impact of environmental conditions at all waypoints and pseudo-waypoints.

The trajectory prediction solution disclosed herein can be created or updated starting at any point or in any phase in the flight profile, as well as once new information is available (flight information, aircraft state, or environmental condition updates). In addition, the trajectory predictions are modifiable by threshold variables (based on business or other rules) and trajectory prediction results can be updated when these threshold variables change, trajectory format requirements change, or the flight information/route changes.

Ongoing situational awareness of both aircraft flight data/state data and resulting trajectories requires data history compilation and knowledge system discovery/processing mechanisms to identify reusable/evolving patterns, in either real-time or post flight. These patterns can be used in both internal and external functions such as (but not limited to) data or object validity and scope refinement, status reporting, function replay, or function restoration/configuration management.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

The system disclosed herein generates a predicted flight trajectory using a combination of aircraft state data, flight information, environmental information, historical data or derived flight information from aircraft messaging which can be used for the transmission of environmental data. Flight information necessary to compute the predicted trajectory (such as waypoints, their locations, estimated time of arrivals (ETAs) at those waypoints, and fuel remaining) is extracted and used, along with aircraft state data, messaging, and their histories, to calculate and derive the predicted trajectory. The predicted trajectory includes pseudo-waypoints at flight transitions not readily available in the flight information and the environmental conditions at all waypoint (including pseudo-waypoint) locations. Thereafter the generated trajectory prediction is assigned confidence and accuracy levels based on fidelity, merit or reliability.

The process/method to create a predicted trajectory(s) for a flight begins with receiving a flight information message. The flight information message may be from an aircraft to a ground station, from a ground source to a ground station, or from an alternate source to an unspecified location (including both source and trajectory solution on airborne platforms, not necessarily the same platform). An aircraft can downlink the flight information in a variety of formats using a variety of methods. It can be transmitted from an aircraft via ACARS, ATN or some other aircraft datalink technology (e.g., broadband satellite IP). From ground sources, the message can be transmitted and received in any unique format specified by the user (e.g., an AOC) or as standardized ground messaging formats (e.g., Type B message format). If used in an airborne system, this process/method could be realized in software or hardware form, and use either air-to-air datalink communications paths or on-board networking, or receive inputs directly from an on-board flight management computer.

Figure 1:
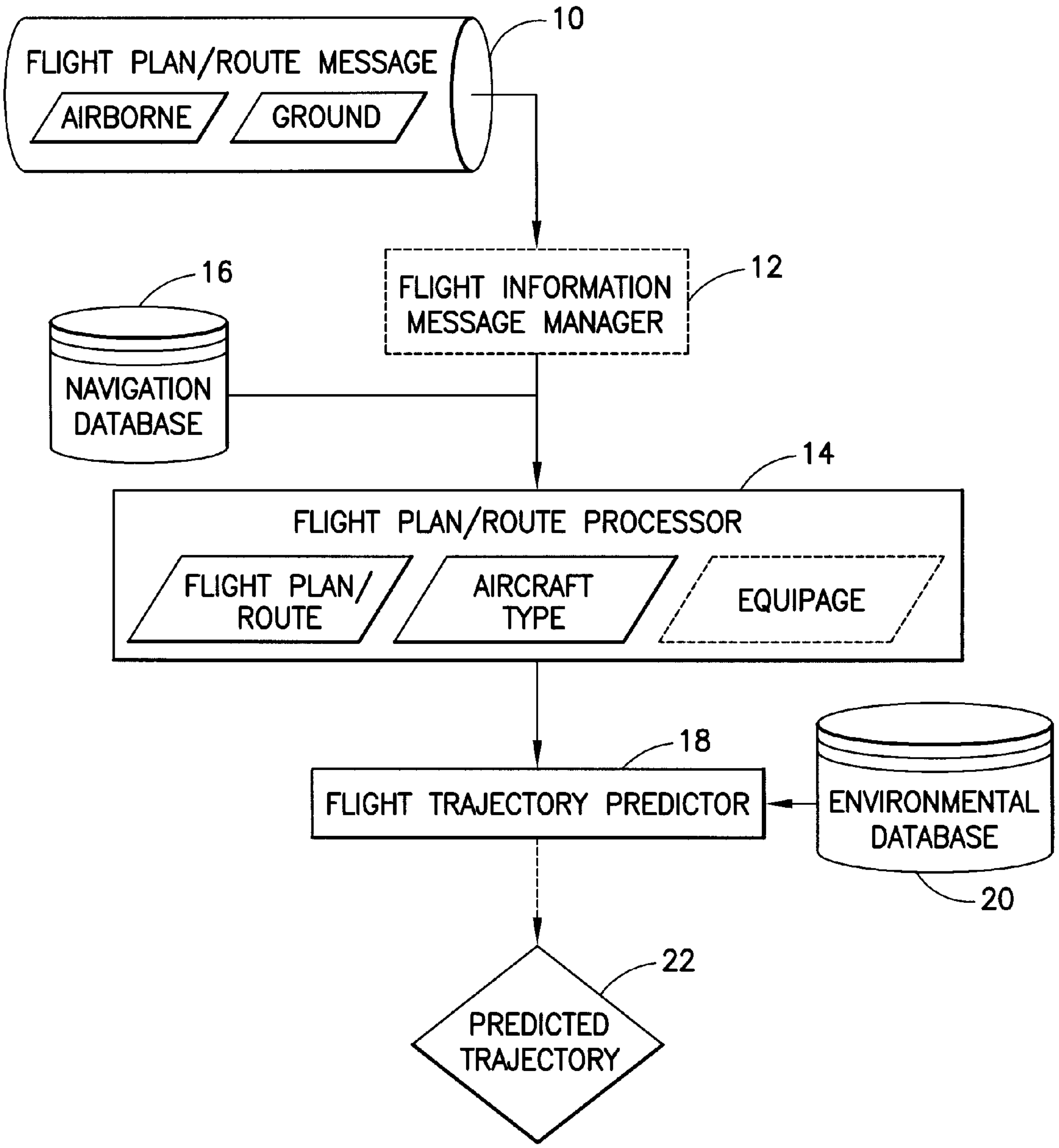
FIG. 1 is a block diagram showing a system for predicting a flight trajectory of an aircraft.

The system seen in FIG. 1 optionally comprises a flight information message manager 12, which is a processor that receives an incoming flight information message 10. The flight information message manager 12 may be included for the purpose of optimizing the creation of a flight object, which is a generic container comprising a multiplicity of fields containing flight information, such as elements of flight plans, flight routes, flight trajectories, etc. The flight object may also contain associated aircraft state data such as weight, center of gravity, fuel remaining, etc. If configured, the flight information message manager 12 would process the flight information and pass the flight plan/route to a flight plan/route processor 14. If the flight information message manager 12 is not included in the configuration, the flight plan/route message 10 would be passed directly to the flight plan/route processor 14 for use in creating a flight object.

In some cases the flight plan/route processor 14 uses data retrieved from a navigation database 16 to convert (e.g., by decoding and translation) flight plan/route information contained in the incoming message 10 into a flight plan/route comprising a list of waypoints and associated flight information. The elements of the decoded and translated flight plan/route are stored in fields of the flight object (along with aircraft type and equipage), where they are available for use by the flight plan/route processor 14 and a flight trajectory predictor 18. The flight object may reside in a separate processor that manages the flight object.

In one example, after the list of waypoints representing the flight plan/route has been derived by the flight plan/route processor 14, it sends a message to the flight trajectory predictor 18 (or other processor) informing the latter that the flight plan/route is available for processing. Alternatively, the flight plan/route processor 14 sends the flight object to the flight trajectory predictor 18. In this alternative example, no message need be sent informing the user that the flight object is ready for retrieval.

In the embodiment depicted in FIG. 1, the flight trajectory predictor 18 (which is also a processor) receives the flight object containing a list of waypoints making up a flight plan/route from the flight plan/route processor 14 and then calculates an updated predicted flight trajectory 22 based on that flight plan/route, an original flight trajectory (if available), the aircraft type and how it is equipped, current and/or forecast environmental conditions retrieved from an environmental database 20, and other information described in more detail below. However, it should be appreciated that the flight trajectory predictor 18 can receive a flight object from any process.

In accordance with one embodiment, the flight trajectory predictor 18 performs the function of creating a complete trajectory or updating an existing one using the most current information received from flight information messages for that flight, adding pseudo-waypoints at flight transitions not explicit in the flight information and selecting the environmental conditions as well as calculating other metadata associated with all waypoint (and pseudo-waypoint) locations. The trajectory prediction process can start at any point in any phase of flight, and modifies its process methods/components as appropriate to the aircraft state and flight information available in messages, known to be available about that phase, known to be available about a future phase, and/or provided by a knowledge system. Flight information available through messaging varies based on the source, aircraft type, configuration parameters, flight state and phase, and other conditions, and trajectory prediction calculations needed may differ by source, aircraft type, state, and phase of flight as well as user configuration information provided. The flight trajectory predictor may receive information on the data source through the user configuration or a knowledge system, which can aid the process in determining which methods/components to use in calculating the trajectory given known information about a flight. All of this information is maintained in a trajectory object (not shown in FIG. 1).

The flight trajectory predictor 18 adds pseudo-waypoints that are not included in the flight plan/route, if indicated to do so by a user configuration or by the required accuracy level. Pseudo-waypoints are points in the trajectory which are not explicitly part of the actual route, but identify where environmental events or flight maneuvers occur, such as speed, altitude, or heading changes. Pseudo-waypoints are also used where constraints must be met, such as a speed or an altitude constraint. Pseudo-waypoints may also come in pairs for the start and end of a transition, as there must be a gradual change for the maneuver planned. The flight trajectory predictor 18 uses the same pseudo-waypoints in its trajectory as the source's flight plan system uses; however the flight trajectory predictor 18 may introduce more pseudo-waypoints not included in the source's trajectory prediction to improve predicted trajectory accuracy. Some examples of reasons additional pseudo-waypoints may be included by the flight trajectory predictor 18 are environmental conditions, air traffic, temporary flight rules, flight conventions, standard flight practices, or user configuration declarations.

The flight trajectory predictor 18 adds environmental data and other metadata for each waypoint and pseudo-waypoint in the trajectory object. As an example of one embodiment, each waypoint and pseudo-waypoint in the trajectory object constructed by the flight trajectory predictor would have an associated position location (latitude, longitude), altitude, phase of flight, estimated time of arrival to the flight destination, fuel remaining, environmental conditions, and metadata used for calculating trajectory data (segment distances, speeds, ETAs at waypoints, etc.). After the application of the environmental data, the trajectory predictions are recalculated. This is a continual iterative process. It is an iterative process because after the environmental data is applied; the trajectory will shift accordingly and new environmental points may have been chosen. If the same environmental points are chosen, the trajectory prediction is at its highest refinement for the given information. Again, this process can be configured to be either dynamic or static. The predicted trajectory(s) 22 is the output of the flight trajectory predictor 18, and can be used as the basis for other calculations, for system or flight status checking or environmental uplink messaging, as a few examples. A system and method for uplinking environmental messages is disclosed in U.S. patent application Ser. No. 13/250,241, which disclosure is incorporated by reference herein in its entirety. The predicted trajectory is stored in the flight object.

Figure 2:
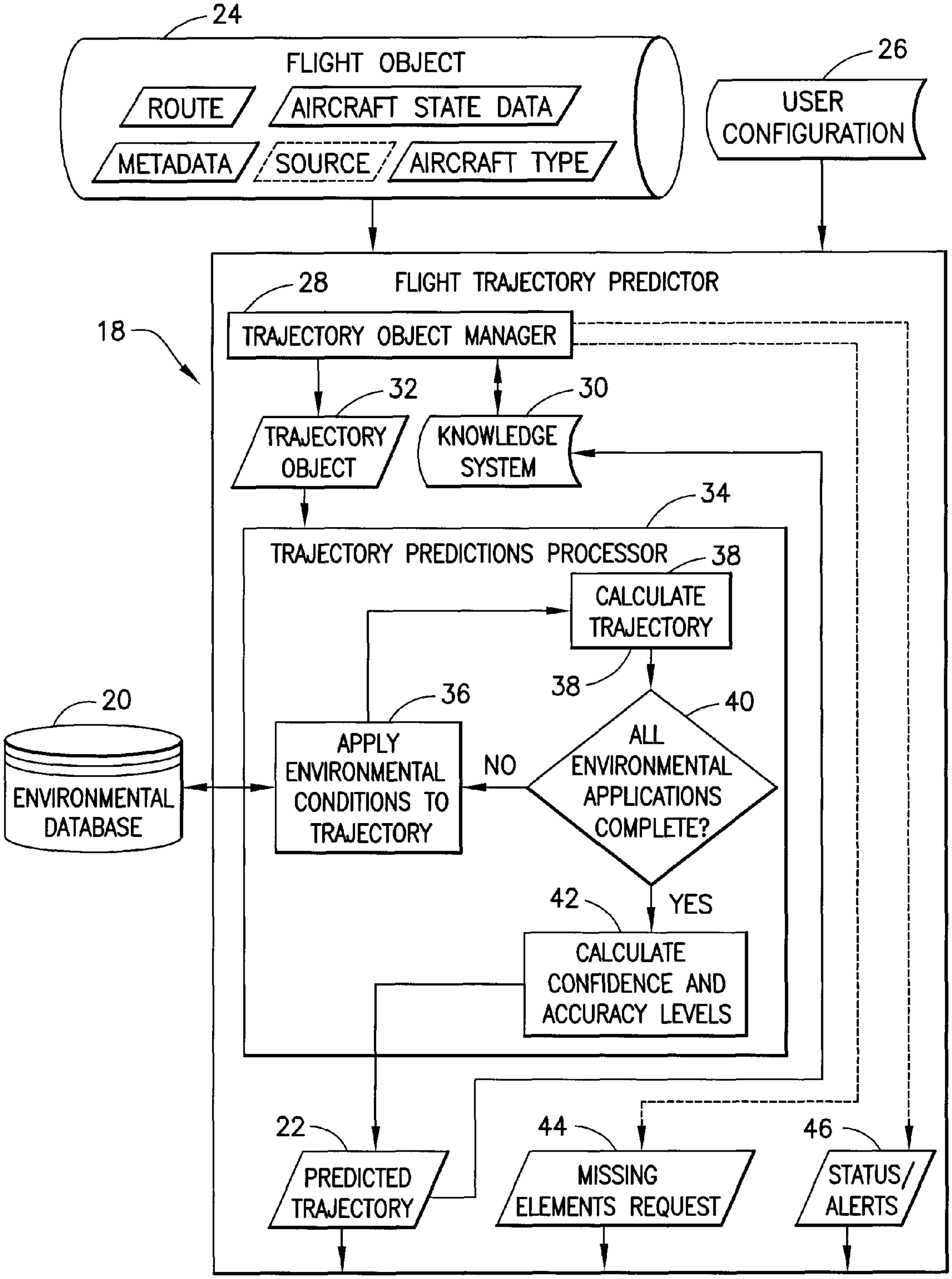
FIG. 2 is diagram showing some details concerning the components and functionality of the flight trajectory predictor in accordance with one embodiment.

Referring now to FIG. 2, the flight object 24 comprises a flight path or route derived after decoding and translation of a set of flight information by the flight information message manager and/or the flight plan/route processor. The flight object 24 may also comprise the aircraft type, aircraft state data, the source of the information and metadata. The flight object 24 may further comprise an incomplete flight trajectory. Optionally, the flight trajectory predictor 18 can adjust its process based on a user configuration 26, such as setting the trajectory prediction process to include or exclude certain components (components for flight information decoding and translation are examples, as are components specific to calculation methods), past flight histories, or available data.

The flight trajectory predictor 18 receives flight object information 24 and can also accept user configuration data 26 to adjust how the predicted trajectory 22 is to be generated. Inside the flight trajectory predictor 18, a trajectory object manager 28 creates or updates a trajectory object template resembling the form the source uses with the flight information that is currently available or which can be derived. The trajectory object 32 may be created when the aircraft is at different phases of flight, and the phase of flight can help the knowledge system 30 (available globally inside of trajectory object manager 28) determine the methods/components or order of components needed to calculate the trajectory. The partially completed trajectory object 32 is then output to a trajectory predictions processor 34.

When a trajectory meeting the trajectory type specified cannot be calculated with the available information—both given in the flight object 24 and derived—the trajectory object manager 28 can create a missing elements request 44. This request may include a request for flight information different than currently available or a request for more recent flight information than the current set. This request 44 can be output to a processor, system log, or flight messaging source. However, when a trajectory object 32 has all of the information needed to calculate a full predicted trajectory, the trajectory object is output to the trajectory predictions processor 34 and is also saved in the embedded knowledge system 30.

Trajectory object manager function status options are generated from knowledge system 30 and provide, for example, trajectory log modeling, function health “self-situational awareness,” and mechanisms to allow for detection of non-normal and abnormal trajectory generation with alert feedback (i.e., status/alerts message 46) outside of the flight trajectory predictor 18, which triggers reprocess (or modified reprocess) opportunities either in real-time (self-healing) or for post-flight analyses. The status/alerts message 46 could also be the result of a combination of security/health features providing the input to and triggers for process protection, attack detection, and restoration of options which can satisfy information assurance mandates.

The trajectory object 32 which the trajectory object manager 28 creates or modifies contains all the trajectory elements obtainable using the available flight information. In accordance with a push-type system, the trajectory object 32 is passed to the trajectory predictions processor 34, which uses the information in that trajectory object to compute the metadata needed to create (i.e., calculate) a complete trajectory (operation 38) and apply environmental data (operation 36) to produce a predicted trajectory 22 for the particular flight. The trajectory predictions processor 34 also calculates the levels of confidence and accuracy of the predicted trajectory (operation 42).

More specifically, the trajectory predictions processor 34 takes a trajectory object 32 and calculates the metadata for all the trajectory points contained in it. Metadata can include information that is associated with the trajectory which the trajectory object manager 28 does not extract, calculate, or derive. Examples of metadata for a trajectory include the segment distances and headings, altitudes, ETAs, and fuel quantities for waypoints and pseudo-waypoints. The specific metadata to be included (calculated or not) is determined by the user configuration 26. Some points may have already been calculated or received metadata (within the trajectory object manager 28), which may be used instead of recalculating their values, but for points without metadata, or those which have been modified, the trajectory predictions processor 34 performs a series of calculations to complete the trajectory prediction.

After metadata has been calculated and inserted, the trajectory object holds a complete trajectory which resembles that of the source of flight information, and the trajectory predictions processor 34 is able now to apply environmental data along the trajectory (operation 36). The environmental conditions for the points in the predicted trajectory can be retrieved from the environmental database 20. The applied environmental conditions affect the performance of the aircraft in flight, especially the speed economy selection of the aircraft and position of pseudo-waypoints. Since the pseudo-waypoints are not fixed in space, their locations may need to be adjusted after the application of environmental data, as well as other flight elements, including but not limited to fuel quantities, altitudes, and ETAs for each of the trajectory waypoints.

Since changes in one part of a trajectory can affect the whole trajectory, the prediction process follows an iterative computation method with the application of environmental conditions. FIG. 2 shows how the trajectory predictions processor 34 first takes in a trajectory object 32 and then calculates the metadata for it, creating a complete trajectory (operation 38). The complete trajectory is needed for the processor to identify what environmental data to pull from the environmental database 20. After the environmental conditions have been applied (operation 36), the trajectory must be recalculated (operation 38) to update its derived pseudo-waypoints, and also recalculate the metadata which would be affected by the changes. The recalculations of the trajectory prediction with reapplied environmental conditions are continued until a determination (operation 40) is made that the predicted trajectory does not require any more additional application of environmental conditions.

The trajectory predictions processor 34 then calculates a confidence level and accuracy level for the predicted trajectory based on the quality of information extracted, calculated, and derived (operation 42). These levels may be evaluated for separate sections of the trajectory or for the predicted trajectory as a whole. The level of predicted accuracy is based on the number of and sources of the specific information, time, distance or flight phase. For example, if flight information has to be derived to calculate a trajectory, because the aircraft has not directly transmitted such information, the level of accuracy of the predicted trajectory may be reduced. This reduction in accuracy may influence the “confidence”. A reduction in confidence may be used for triggers of other applications to perhaps increase aircraft messaging or request additional information directly. As another example, if a weather front or storm cell is predicted to pass through an area, the confidence in weather predictions for that area decreases and thus the confidence in a trajectory prediction may also diminish. As a further example, if sensor data that provides near real-time weather for the vicinity of that same predicted trajectory is used, the confidence of the trajectory prediction goes back up. After going through the trajectory predictions processor 34, the flight trajectory predictor 18 has a predicted trajectory 22 with associated confidence and accuracy ratings which it may output, in whole or in part, for use by follow-on applications, such as a message constructor (not shown in FIG. 2). The predicted trajectory 22 with associated confidence and accuracy levels is also stored in the knowledge system 30.

Figure 3A:
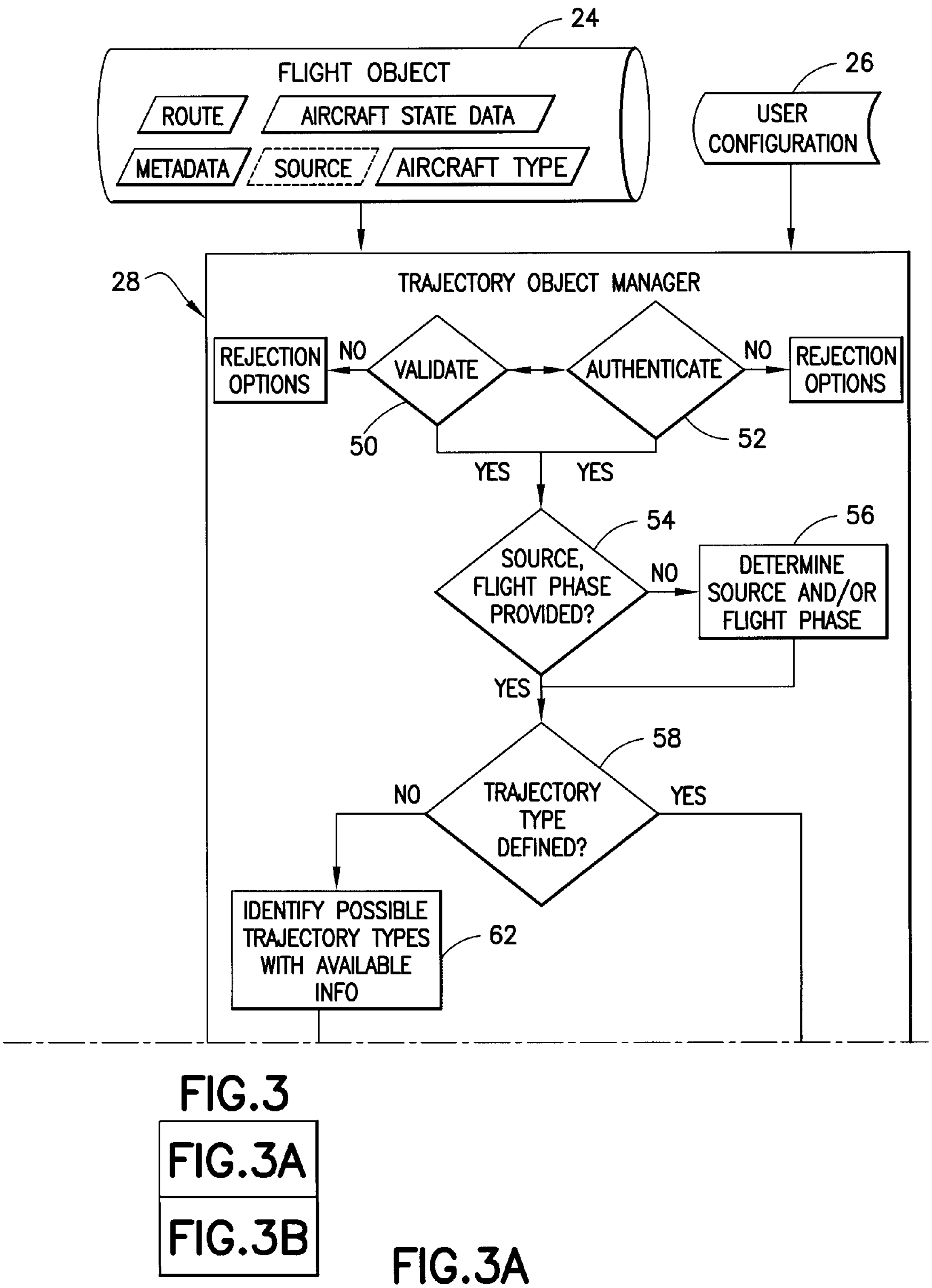
FIG. 3 consists of FIGS. 3A and 3B, which taken together form a flowchart showing operations performed by a trajectory object manager incorporated in the flight trajectory predictor depicted in FIG. 2.
Figure 3B:
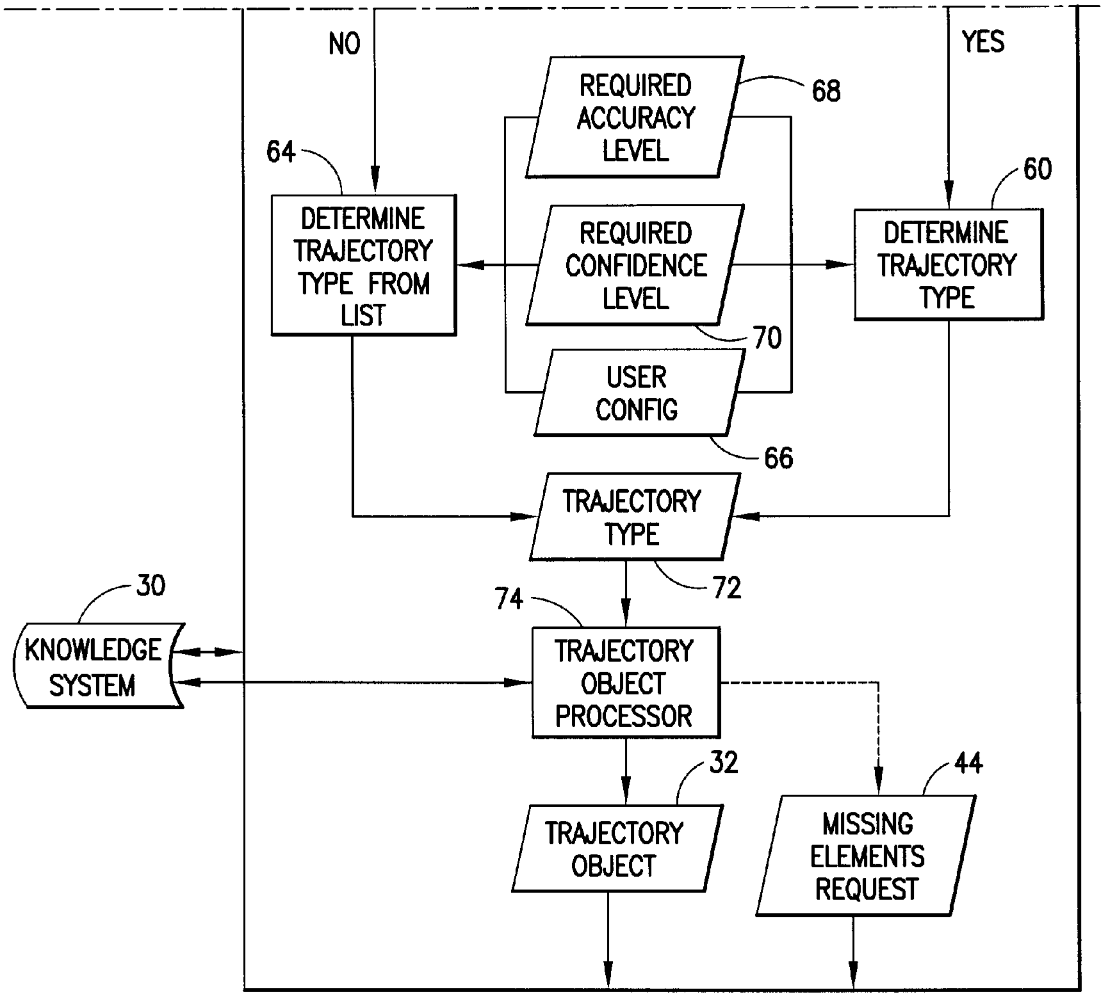

An example of a trajectory object manager process is shown in FIG. 3, which consists of FIGS. 3A and 3B. Referring first to FIG. 3A, system security interface options are identified for input validity (operation 50) and access authentication (operation 52), as are required for any networked system, and would be part of a federated/distributed security scheme for all functions/subsystems/devices of the system employing the flight trajectory predictor. If the input is invalid or access is not authorized, the trajectory object manager selects a rejection option.

If the flight object is valid and authentic, then the trajectory object initiates the process for generating a trajectory object. To generate a trajectory object 32, the minimum data requirements for the trajectory calculations must be confirmed as available (operation 54 in FIG. 3A). The trajectory object manager 28 may receive information about the source of the flight Information and the flight phase; however, if not provided, the trajectory object manager 28 determines the source and flight phase (operation 56 in FIG. 3A) from the information that is available in the flight object 24. For example, assume that the trajectory object manager 28 receives a flight object 24 from the flight plan/route processor (item 14 in FIG. 1) which contains an aircraft's flight plan, current state data, and tail ID. The source information and aircraft type can be determined from the tail ID according to the user configuration 26. The flight phase can be determined using the state data with the flight plan, comparing the current altitude with the flight plan's cruise altitude and flight schedule, if all are available.

The trajectory object manager 28 also identifies the necessary minimum process components needed to build a trajectory prediction that resembles that of the source, desired output trajectory, or the process components to be included or deleted according to user configuration instructions. The user configuration 26 may contain specific rules, conventions, or practices to which the trajectory must adhere. The user configuration 26 may contain a default trajectory format for new or unfamiliar sources; or it may follow rules to infer trajectory types based on flight information content, such as determining whether the source is an aircraft or a ground system. The knowledge system 30 (see FIG. 3B) records the trajectory object manager's results for future reference and subsequent use for improving trajectory predictions for other flights.

Once the trajectory object manager has the source and aircraft state data, it determines if there is a defined trajectory type for that data (operation 58 in FIG. 3A). If the trajectory type is already defined for the source and flight phase provided, then that type will be used (operation 60 in FIG. 3B) in conjunction with any user configuration settings 66 applied. If there is no defined trajectory type, the trajectory object manager identifies trajectory types that are possible to create with the available information (operation 62 in FIG. 3A). The knowledge system 30 (see FIG. 3B) may use heuristics, correlation, learning algorithms, accumulated evidence, existing flight object information, state data/flight phase, and other information to discover and select criteria for possible trajectory types. The knowledge system 30 is capable of updating itself with new data, after that data has been tested for validity and authentication. From the list, a trajectory type 72 is chosen (operation 64 in FIG. 3B) which also meets the user configurations, and the required accuracy and confidence levels (items 68 and 70 in FIG. 3B) for the trajectory type 72 are recorded. Status/alerts are associated with the trajectory object 32 or predicted trajectory 22. The trajectory type 72 is then sent with the flight information to a trajectory object processor 74, which creates or updates a trajectory object 32 for the particular flight.

Figure 4A:
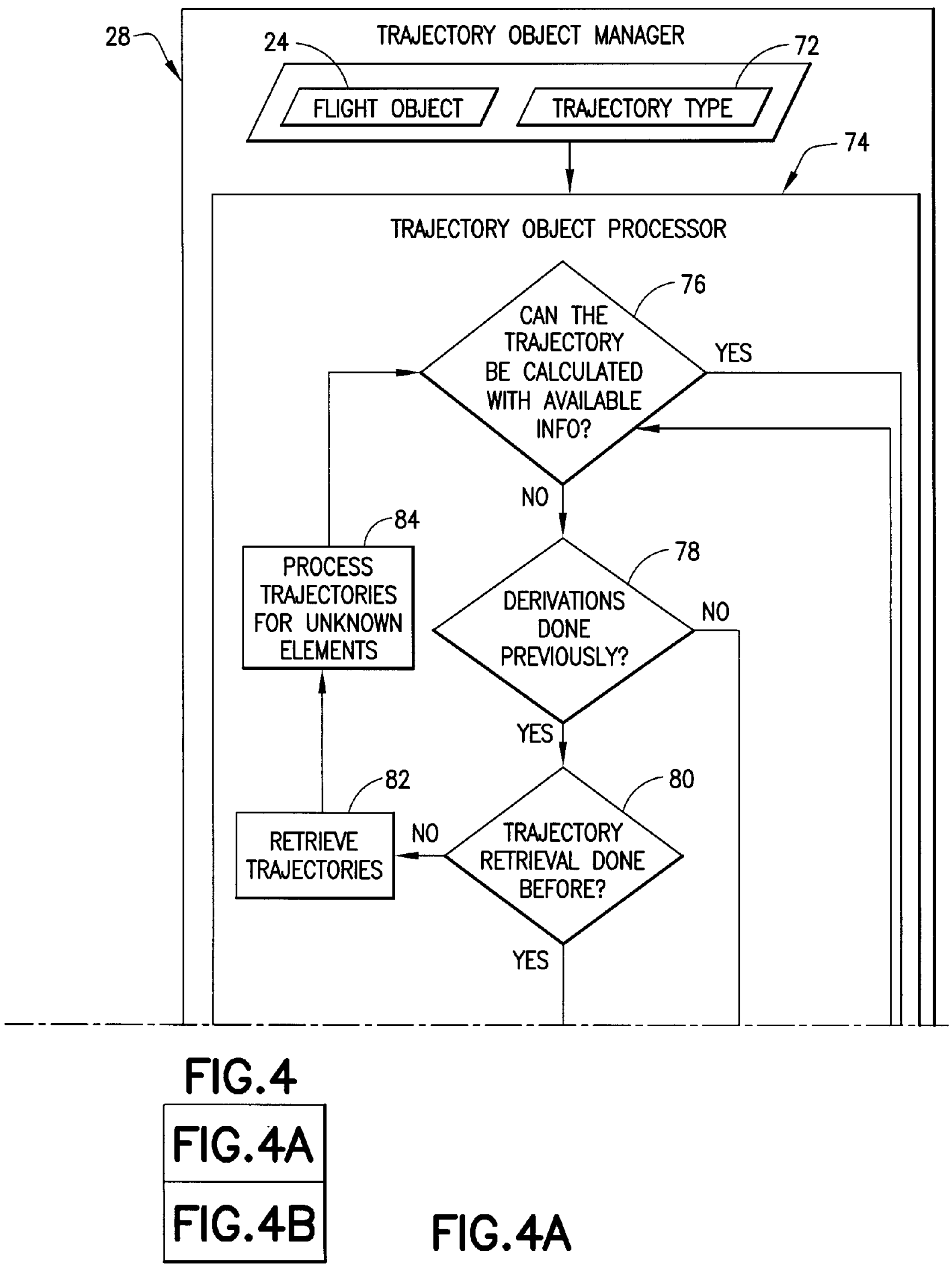
FIG. 4 consists of FIGS. 4A and 4B, which taken together form a flowchart showing operations performed by a trajectory object processor incorporated in the trajectory object manager depicted in FIG. 3B.
Figure 4B:
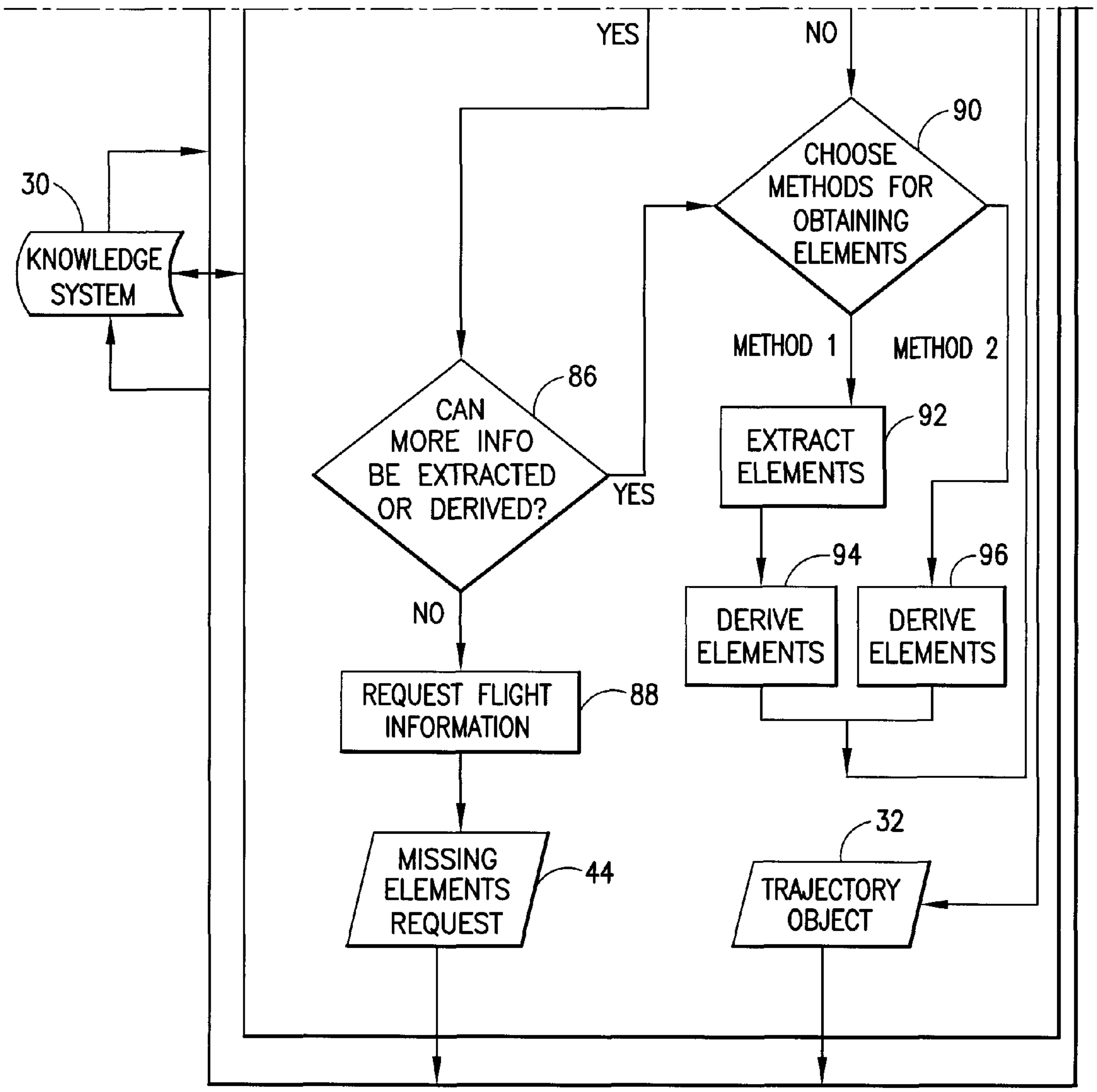

The process for calculating a trajectory with the known information in accordance with one embodiment is shown in FIG. 4, which consists of FIGS. 4A and 4B. Referring first to FIG. 4A, the trajectory object processor 74 determines whether a trajectory can be calculated from the available information (operation 76). This is determined with reference to what specific level of information a user has requested. If all the necessary data for a trajectory is included in the flight object 24, then a trajectory object 32 (shown in FIG. 4B) is created immediately and output to the trajectory predictions processor (item 34 in FIG. 2). If in operation 76 the trajectory object processor 74 determines there is insufficient data to create a trajectory of the specified trajectory type, elements of the trajectory may possibly be derived. First, the trajectory object processor 74 determines whether derivations have been done previously (operation 78 in FIG. 4A). If not, then a derivation method is selected. There are many possible derivation methods for various trajectory elements; some use different sets of flight information, or larger sets of information, and some can be more accurate than others. Based on the available flight information, the required confidence and accuracy levels, and the trajectory type needed, the trajectory object processor 74 determines (operation 90 in FIG. 4B) which methods to use in order to derive the needed information for the trajectory object, and at the needed level of confidence and/or accuracy. The trajectory object processor can adjust its calculations depending on the information that is available in a flight, as there can be multiple ways to calculate or derive trajectory elements.

FIG. 4B illustrates two methods (Method 1 and Method 2) that can be chosen for deriving the trajectory elements based on known information. This illustration represents one possible implementation of the trajectory object manager and is not meant to limit the invention. For the two methods shown in FIG. 4B, Method 1 contains more steps than Method 2. In accordance with Method 1, some elements are extracted directly (operation 92) and others are calculated from the available flight information (operation 94). In accordance with Method 2, missing elements are derived from the available flight information (operation 96). While both methods have a "Derive Elements" block, the derivations used may be different between Method 1 and Method 2. Trajectory elements are derived using a combination of conversion formulas, equipage, airspace and aircraft constraints, the knowledge system, and rules of best practice with information gained from current and/or past flight information messages. For cases where more pertinent information is known for the flight, a more accurate derivation may be possible. Operation 90 uses one or more of a knowledge system, extraction, calculation, and derivation to ascertain the trajectory elements that result in a predicted trajectory which best meets the required confidence and accuracy levels given the known information. When data is missing for the most preferred derivation method to be used for a necessary trajectory element, then an alternate method must be used to generate a prediction for that element. While FIG. 4B shows only two possible options for computing the trajectory elements, there may be many options when there are multiple elements with multiple methods of prediction. A third example would be using a system of linear equations to determine the position of specific waypoints or all pseudo-waypoints based on previous flight histories. Another option employed by trajectory object processor 74 is to use displacement vectors to determine the needed elements. Once derivations have been completed and new information has been obtained, the process returns to operation 76 (see FIG. 4A) which determines whether a trajectory can be calculated with the available information.

If still a trajectory cannot be calculated, operation 78 is repeated. This time, because a derivation has been done previously, the process moves to operation 80, which determines whether trajectory retrieval has been done previously. If trajectory retrieval has not been done previously, the process can retrieve other trajectory objects from the knowledge system (operation 82), such as previous flight histories for that particular aircraft, and infer trajectory elements from current versus previous flight performance (operation 84) or from aircraft operating in proximity. The flights used to generate trajectory objects by the knowledge system can be selected from flights flown in similar conditions; examples may include flights flown within a time horizon, or in similar environmental conditions, or in same time period, or those with the same flight path segments. By recording the state and predictions of aircraft for multiple flights for similar procedures and their performance, the trajectory prediction for another aircraft flying a similar procedure can be estimated more accurately according to its state and how it differs from the other flights using hysteresis analysis.

For example, for the descent phase of flight, the top of descent is unknown; however, it can be determined accurately from time in the aircraft messaging when in or near descent. So if a top of descent for a trajectory needs to be predicted for a flight, the data from flights of the same aircraft type with similar gross weight, speed, and flying in similar environmental conditions can be gathered and analyzed. Then a top of descent position or some other trajectory elements which may be used to determine the top of descent position, such as a descent flight path angle, may be estimated from interpolation of that data to match the current aircraft's conditions.

If the trajectory elements obtained from the hysteresis analysis do not directly contribute to the information needed to calculate a trajectory object, they may allow new information to be derived. Therefore if a trajectory is still unable to be calculated with the accumulated information, the process determines whether more information can be extracted or derived (operation 86 in FIG. 4B). If the determination is affirmative, another iteration of derivations can be completed to derive new trajectory elements.

If the trajectory object manager 28 determines that more information cannot be extracted or derived (operation 86), then a request for flight information is constructed (operation 88). A missing elements request 44 is then outputted to a processor, system log, or flight messaging source, as previously described.

At a minimum, the cruise altitude, climb speed, cruise speed, etc. are needed to predict a gate-to-gate flight trajectory. The minimum required data set is dependent on the flight phase and requested level of accuracy and/or confidence. If the user requests the most accurate trajectory prediction, the minimum information is not enough. The level of accuracy and/or confidence requested by a user dictates what additional information beyond the minimum is needed. This is captured by the user configuration 26 (see FIG. 2). For example, a user configuration might specify that an output to User X must have a confidence level Y and/or an accuracy level Z. From Y or Z, it is known that the basic set of information to compute a trajectory is $D_1, D_2, \ldots D_n$ and must be from a Source A and consist of pseudo-waypoints WP1, WP2, . . . WPn. If these basic trajectory elements are not available, the trajectory object processor 74 (see FIG. 4) tries to obtain the missing information by deriving, calculating, extracting and requesting. If it cannot obtain the missing information, the trajectory predictions processor 34 (see FIG. 2) will still output a predicted flight trajectory 22 because the minimum data set was available, but the accuracy level and confidence level calculated by the trajectory predictions processor 34 would show a lower level than what was requested, and the user would then know the requirement had not been met. In accordance with one embodiment, the output is always a trajectory prediction, unless the minimum information necessary is not available. The desired output is basic trajectory prediction from the available flight information and/or a trajectory prediction equal to the requested level of accuracy and/or confidence. This means that multiple outputs for various users at varying levels of confidence and accuracy can be generated.

Figure 5:
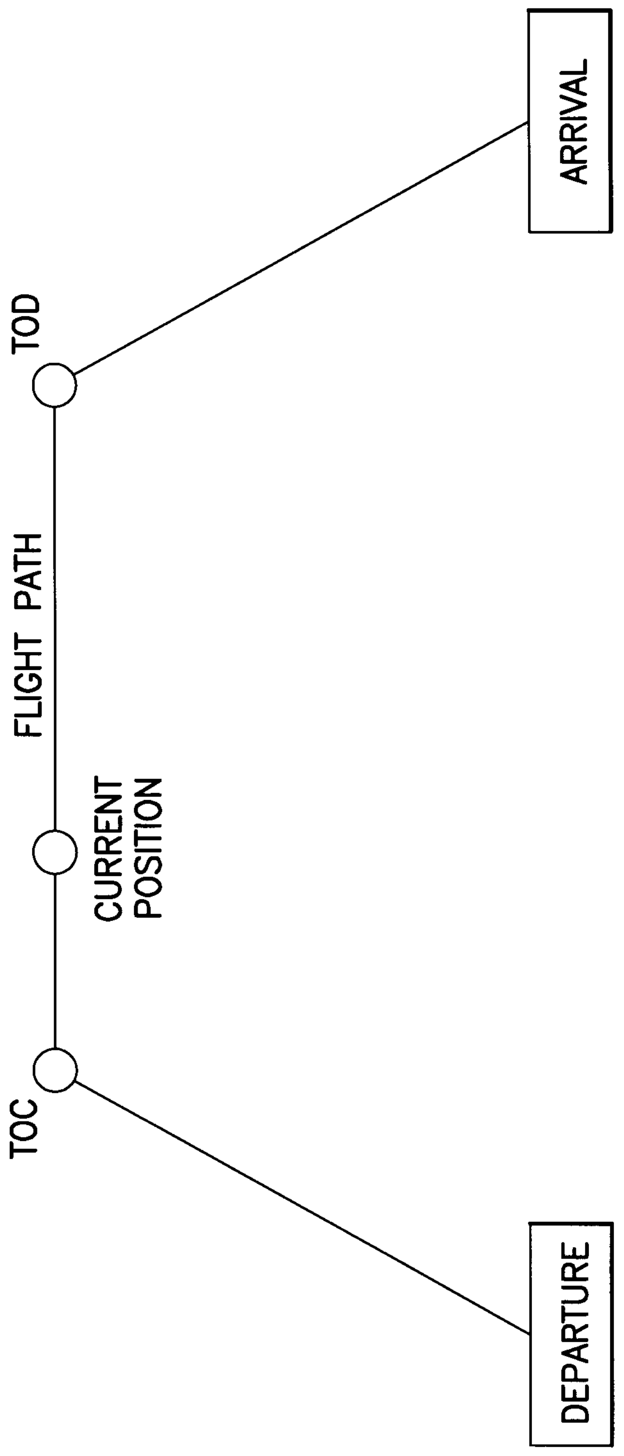
FIG. 5 is a diagram representing a simplified trajectory profile.

An illustration of an idealized trajectory profile is shown in FIG. 5. Two pseudo-waypoints that are necessary to define the vertical profile of the trajectory are the top of climb (TOC) and top of descent (TOD). If the aircraft's current state is before the top of climb, a list of basic trajectory elements which may be needed to generate a baseline trajectory with top of climb and top of descent as seen in FIG. 5 would be the Origin, Destination, Cruise Altitude, Climb Speed, Cruise Speed, and Descent Speed. In some instances these could all be reported in a flight plan; however, often some or all of these elements must be calculated or derived using other available information. The content of the flight information can vary with different data sources, so the trajectory object manager must be able to adjust its method for obtaining trajectory elements based on the available information. Also, elements may need to be derived using information from a combination of different sets of flight information messages, and so the ability to use current flight information with stored past flight information history is required. Depending on the user configuration (which is also dependent on the flight information source), more details and pseudo-waypoints may need to be calculated, requiring different sets of trajectory elements to be known. Examples of these could be pseudo-waypoints that define transitions in the trajectory for speed or altitude constraints that must be met in the climb or descent phases or a step climb or step down during the enroute phase.

In the example seen in FIG. 5, the aircraft is in the enroute phase of flight. Therefore the top of climb has already been passed, and only the top of descent needs to be derived. The top of descent identifies where the aircraft will transition from flying at its cruise altitude to a descent to the destination. The following is an example of how a top of descent may be derived from flight information messaging.

A flight information message is received with the status that the aircraft is a specified time away from its top of descent along with the timestamp indicating when that message was sent. In this example, the method/process uses the current speed of the aircraft, which has been derived from flight information (segment speeds, or an alternate combination of trajectory predictions processor functions), and the aircraft position, extracted from flight information to locate the predicted top of descent (TOD in FIG. 5) position at the specified time in the future.

Another advantageous embodiment further improves the accuracy of the trajectory prediction by improving the derivation technique itself. For instance, there is error in the derivation of the speed calculations currently used which is due in part to the timestamp in the message received. To reduce error in the top of descent calculations using the derived speed, the speed used must be calculated in the same way as the source's reported speed. This means adjusting the speed to incorporate environmental conditions used by the source. As the flight information message may be routed through multiple relays, the timestamp of the message may be the time it was sent from one of the relays, not the source. So the flight information should contain a separate element indicating the time when the message was sent independent of the timestamp, in order to identify the aircraft position and predict the time/distance to top of descent.

However if trajectory prediction is required before flight information detailing a specified time to top of descent has been received (e.g., before departure), an alternative method must be used to estimate the top of descent and then refine it later. One approach to these calculations requires a descent path angle or projected rate of descents, which is derived from the aircraft's cruise speed, descent speed and altitude and descent speed constraints into its destination. Calculations can then extrapolate backwards starting from the last waypoint or pseudo-waypoint with a computed or specified altitude (near the destination). Waypoint altitude calculations are continued until the cruise altitude is reached, signifying the top of descent point. Thus multiple methods must be available for trajectory calculations, depending on the known flight/trajectory information. The example becomes more complex with an aircraft type that provides minimal flight information.

The process described for the trajectory object manager represents just one exemplary embodiment and is not intended to limit the scope of the invention. Other embodiments may consult the previous trajectory objects for all derivations to improve confidence levels, as an example of more knowledge system discovery. As flights operate, the derivations of waypoint positions could be filtered with known data of other current or past flights from the trajectory log in real time to make accurate flight predictions for a particular aircraft.

Embodiments employing hysteresis of past flight data in trajectory predictions could be done in two ways. One method is to include the additional data in the derivations of the predicted trajectory. This could be done by building a system of equations using all of the available data and calculating a resulting trajectory prediction, such as a pseudo-waypoint location or a speed. Another method is to augment the predicted trajectory already derived with interpolation or projections of the aircraft state onto past flight data. An example of how a final predicted trajectory could be generated from these is through a weighted combination of the predicted trajectory and a projection which fuses the data sets weighted with respect to their estimated accuracy. So, early in the flight the hysteresis data would be relied on more, but closer to the descent the derived values of the predicted trajectory would be weighted more.

The trajectory prediction generated from these methods and system is completed without the use of any specific aircraft performance database, using the current flight information received and an independent environmental database. This trajectory prediction system also can adapt its output dependent on a static user configuration or dynamically based on the available information or past known flight information. This trajectory prediction system also produces a higher accuracy solution due in part to utilizing in situ and forecasted environment data and the techniques used to derive unknown flight data elements. The output solution can also include an identifier distinguishing the level of accuracy and/or confidence of the trajectory predictions.

Using dynamic prediction methods/processes based on available information as well as an embedded knowledge system, the system is able to adapt to many different sources, both airborne and ground, and generate predicted trajectories which correlate with the source's format, as opposed to having its own independent format.

The predicted trajectory solution is dependent on pseudo-waypoints and their locations and metadata. Since the flown flight path and speed is affected by the weather, the pseudo-waypoints can be modified by adding current weather data unavailable to the aircraft's on-board computer.

By calculating the trajectory without referring to a performance database, solutions can be found for many different types of aircraft and their equipage. Since all of the pseudo-waypoints and their metadata are extracted, derived, or calculated from the received flight information, only the format, content, and timing of flight information needs to be accommodated by the method/process to extend services for different aircraft, airlines, or equipage.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The method claims set forth hereinafter should not be construed to require that all operations of the method be performed in alphabetical order or in the order in which they are recited.

The invention claimed is:

1. A flight trajectory prediction system comprising one or more processors programmed to perform the following operations:

(a) obtaining flight information and aircraft state information from a flight object representing a flight of an aircraft;

(b) determining whether the obtained information is sufficient to predict a trajectory; and (c) calculating a predicted flight trajectory in response to a determination by operation (b) that the obtained information is sufficient to predict a flight trajectory, wherein the predicted flight trajectory is calculated using aircraft messaging, flight histories, state data and current and forecast environmental information, wherein the predicted flight trajectory is calculated without using aircraft performance data, and wherein the predicted flight trajectory comprises pseudo-waypoints not identified in the flight information and environmental conditions at those pseudo-waypoints.

2. The system as recited in claim 1, wherein one of said one or more processors is further programmed to attempt to derive missing information in response to a determination by operation (b) that the obtained flight information is not sufficient to predict the flight trajectory.

3. The system as recited in claim 1, wherein one of said one or more processors is further programmed to attempt to extract the missing information from flight information retrieved from a knowledge system.

4. The system as recited in claim 1, wherein one of said one or more processors is further programmed to attempt to extract the missing information from a flight information object.

5. The system as recited in claim 1, wherein one of said one or more processors is further programmed to send a request for missing information in response to a failure to determine the missing information.

6. The system as recited in claim 5, wherein one of said one or more processors is further programmed to analyze costs associated with aircraft messaging before requesting missing information.

7. The system as recited in claim 1, wherein operation (c) comprises iteratively computing predicted flight trajectories with the application of environmental conditions.

8. The system as recited in claim 1, wherein operation (c) comprises computing metadata for waypoints and pseudo-waypoints of the predicted flight trajectory.

9. The system as recited in claim 1, wherein one of said one or more processors is further programmed to calculate a level of confidence or a level of accuracy of the predicted flight trajectory.

10. The system as recited in claim 1 wherein said one or more processors are further programmed to obtain user configuration information comprising trajectory specification requirements which identify types of metadata to be included in said predicted flight trajectory to be calculated in operation (c).

11. The system as recited in claim 10, wherein multiple predicted flight trajectories for various users at varying levels of confidence and accuracy and in accordance with varying trajectory specification requirements are calculated in operation (c).

12. A method, performed by one or more processors, for predicting a flight trajectory comprising:

(a) obtaining flight information and aircraft state information from a flight object;

(b) determining whether the obtained information is sufficient to predict a trajectory; and (c) calculating a predicted flight trajectory in response to a determination by operation (b) that the obtained information is sufficient to predict a flight trajectory, wherein the predicted flight trajectory is calculated using aircraft messaging, flight histories, state data and current and forecast environmental information, wherein the predicted flight trajectory is calculated without using aircraft performance data, and wherein the predicted flight trajectory comprises pseudo-waypoints not identified in the flight information and environmental conditions at those pseudo-waypoints.

13. The method as recited in claim 12 further comprising attempting to derive missing information in response to a determination in operation (b) that the obtained flight information is not sufficient to predict the flight trajectory.

14. The method as recited in claim 12 further comprising attempting to extract the missing information from a flight trajectory retrieved from a knowledge system in response to a failure to determine that missing information.

15. The method as recited in claim 12 further comprising attempting to extract the missing information from a flight information object.

16. The method as recited in claim 12 further comprising sending a request for missing information in response to a failure to determine the missing information.

17. The method as recited in claim 16, further comprising analyzing costs associated with aircraft messaging before requesting missing information.

18. The method as recited in claim 12 wherein operation (c) comprises iteratively computing predicted flight trajectories with the application of environmental conditions.

19. The method as recited in claim 12 wherein operation (c) comprises computing metadata for waypoints and pseudo-waypoints of the predicted flight trajectory.

20. The method as recited in claim 12 further comprising calculating a level of confidence in or a level of accuracy of the predicted flight trajectory.

21. The method as recited in claim 12 further comprising the operation of obtaining user configuration information comprising trajectory specification requirements which identify types of metadata to be included in said predicted flight trajectory to be calculated in operation (c).

22. The method as recited in claim 21, wherein multiple predicted flight trajectories for various users at varying levels of confidence and accuracy and in accordance with varying trajectory specification requirements are calculated in operation (c).

23. A system comprising:

a trajectory object manager which generates a trajectory object based at least in part on a trajectory type and information in a flight object if the information in the flight object is sufficient to calculate a trajectory; and a trajectory predictions processor which calculates a predicted flight trajectory using aircraft messaging, flight histories, state data and current and forecast and without using aircraft performance data, wherein the predicted flight trajectory comprises pseudo-waypoints not identified in the flight object and environmental conditions at those pseudo-waypoints.

24. The system as recited in claim 23, wherein said trajectory object manager is programmed to perform the following operations if the information in the flight object is not sufficient to calculate the predicted trajectory:

(a) derive missing information;

(b) extract the missing information from the available flight information in response to a failure to determine that missing information in operation (a); and (c) send a request for missing information in response to a failure to determine the missing information in operations (a) and (b).

25. The system as recited in claim 23, wherein said trajectory predictions processor calculates a level of confidence or a level of accuracy of the predicted flight trajectory.

26. The system as recited in claim 23, wherein said one or more processors are further programmed to obtain user configuration information comprising trajectory specification requirements which identify types of metadata to be included in said predicted flight trajectory calculated in operation (c), and wherein said calculation of the predicted flight trajectory comprises:

(i) creating or updating a trajectory object comprising trajectory points of a flight trajectory and related metadata;

(ii) calculating metadata of the identified types for at least some of the trajectory points stored in the trajectory object;

(iii) applying environmental data corresponding to the trajectory points stored in the trajectory object;

(iv) recalculating at least some of the metadata of the identified types based on the applied environmental information;

(v) determining whether to adjust the locations of at least some of the trajectory points or not based on the applied environmental information;

(vi) adjusting the locations of at least some trajectory points in response to a determination in operation (v) that such locations should be adjusted; and (vii) repeating operations (iii) through (v) after operation (vi) has been performed.

* * * * *